(12) United States Patent
Rho

(10) Patent No.: US 10,099,943 B2
(45) Date of Patent: Oct. 16, 2018

(54) APPARATUS AND METHODS FOR DESALINATION AND MINERAL REDUCTION OF WATER RESOURCES BY VERTICAL FREEZING

(71) Applicant: Jai H. Rho, Pasadena, CA (US)

(72) Inventor: Jai H. Rho, Pasadena, CA (US)

( * ) Notice: Subject to any disclaimer, the term of this patent is extended or adjusted under 35 U.S.C. 154(b) by 244 days.

(21) Appl. No.: 15/079,310

(22) Filed: Mar. 24, 2016

(65) Prior Publication Data

US 2017/0275184 A1    Sep. 28, 2017

(51) Int. Cl.
*B01D 35/18*    (2006.01)
*C02F 1/22*    (2006.01)
*B01D 9/00*    (2006.01)
*C02F 103/08*    (2006.01)

(52) U.S. Cl.
CPC ............ *C02F 1/22* (2013.01); *B01D 9/0009* (2013.01); *B01D 2009/0086* (2013.01); *C02F 2103/08* (2013.01)

(58) Field of Classification Search
USPC .......... 159/45, 1.1; 203/10, 48, 50, DIG. 17; 62/58, 123, 536, 535, 542; 210/703, 774
See application file for complete search history.

(56) References Cited

U.S. PATENT DOCUMENTS

| | | | |
|---|---|---|---|
| 3,714,791 A * | 2/1973 | Peck | C02F 1/22 62/537 |
| 3,835,658 A * | 9/1974 | Wilson | B01D 9/0009 62/535 |
| 4,291,549 A * | 9/1981 | Fujimura | B01D 9/0009 366/170.3 |
| 4,954,151 A | 9/1990 | Chang | |
| 5,555,747 A | 9/1996 | Conlon | |
| 8,696,916 B2 | 4/2014 | Buchsbaum | |
| 2012/0247149 A1* | 10/2012 | Labelle | F01K 25/10 62/544 |
| 2014/0223958 A1* | 8/2014 | McCormack | B01D 9/0009 62/533 |
| 2017/0074248 A1* | 3/2017 | Enis | F03D 9/17 |
| 2017/0190597 A1* | 7/2017 | Lissianski | C02F 1/22 |

OTHER PUBLICATIONS

"CryoDesalination" Website, http://cryodesalination.com/, publication date unknown.

(Continued)

*Primary Examiner* — Nina Bhat

(57) ABSTRACT

Apparatus and methods are disclosed for separating salts, minerals, organic matter and other impurities from seawater, brackish water, wastewater or other water resources by freezing contained water in a downward vertical direction. Generally, feed water is pumped into a tank and a refrigerant contacts the upper surface of the feed water to form a layer of ice. During this process, salt and other impurities are rejected from the ice layer into the feed water below. By continuing this process, the feed water will freeze in a downward direction as the ice layer thickens. Salt and other impurities will continue to be rejected into the feed water and may be drained from the tank through a drain pipe after a block of ice is formed. Additional feed water may then be pumped into the tank to raise the block of ice for removal or ejection from the tank.

17 Claims, 5 Drawing Sheets

(56) References Cited

OTHER PUBLICATIONS

"Desalination for Water Supply," R Clayton, published by Foundation for Water Research, First Edition published Feb. 2006, Third Edition published Jun. 2015.
"Freezing Desalination Process," Z. Lu and L. Xu, Thermal Desalination Processes vol. II, publication date unknown.
"Freezing-Melting Desalination Process," Mohammad Shall ur Rahman and Mohamed Al-Khusaibi, Desalination pp. 473-502, published 2014 by Scrivener Publishing LLC.
"Recent Improvements to the Freeze Crystallization Method of Water Purification," William M. Conlon, publication date nknown.

* cited by examiner

APPARATUS AND METHODS FOR DESALINATION AND MINERAL REDUCTION OF WATER RESOURCES BY VERTICAL FREEZING

BACKGROUND

Approximately 70% of the Earth's surface is covered by water. However, only a small fraction of the world's water supply is naturally accessible as freshwater for household, agricultural, industrial, environmental and other purposes. The primary source of freshwater is currently atmospheric precipitation, mostly as rainfall or snowfall, which is captured in surface and underground structures and formations such as lakes, reservoirs, aquifers, watersheds, snowpack and glaciers.

Significantly, recent changes in climactic conditions have led to reduced atmospheric precipitation in many geographical areas where freshwater has historically been captured or utilized-resulting in severe droughts, depletion of supply, environmental harm, excess demand and other undesired consequences. Moreover, increasing population in these and other locations has accelerated the effects of reduced freshwater availability and contributed to a growing need for additional or alternative sources of freshwater.

Traditional responses to shortages and fluctuations in freshwater supply have included conservation, rationing, recycling and wastewater treatment, among others. While these approaches may be helpful in providing near term adjustments to changing conditions, they do not increase the overall supply of freshwater. Other conventional solutions have included construction of large dams, reservoirs and other facilities for capture and storage of freshwater, but such solutions are dependent upon favorable climactic conditions and limited by geological, structural and other factors. Additionally, freshwater has been transported from particular resources or regions to others through pipelines, aqueducts, tunnels and canals, but these methods generally diminish overall supply through evaporation, seepage and other loss, and may result in environmental or other harm to areas where water is removed, diverted or transported.

Desalination of seawater or brackish water has also been utilized to provide additional or alternative supplies of freshwater. The primary methods of desalination have generally been distillation or filtration, which typically require substantial energy consumption and complex facilities and infrastructure. As an example, multi-stage flash distillation (MSF) is a thermal process that involves heating and sequential flash evaporation of feed water through a series of stages or chambers having lowered vapor pressures at successive stages. The evaporated feed water is condensed at each stage to form product water having reduced salinity and the remaining feed water is discharged as brine. A similar process to MSF is multiple-effect distillation (MED) which utilizes evaporated steam to heat feed water in successive stages through a series of connecting tubes. When feed water inside a chamber contacts a connecting tube filled with steam, the feed water partially evaporates and the steam inside the tube condenses to form product water. The remaining feed water is discharged as brine and the evaporated steam flows into the connecting tube of another chamber.

A widely used form of filtration involves reverse osmosis (RO) in which high pressure pumps overcome osmotic pressure to diffuse water molecules through selective pores of semi-permeable membranes that prevent passage of larger molecules such as salt, organic compounds and other solutes. Such membranes are typically layered with other materials that provide channels for separated flow of product water and brine, and are deployed inside pressure tubes in a spiral configuration during operation. Generally, feed water is only partially pumped through a membrane to provide product water while unfiltered feed water is used to flush away brine.

When solutes and other impurities accumulate inside the pressure tubes, the membranes may become fouled and must be cleaned or replaced by removal from the pressure tubes or other process. In order to reduce or minimize fouling of membranes, feed water often undergoes pretreatment in beach wells, sediment filters, carbon filtration, chemical treatment or other methods. The purity of product water may also be improved by re-pumping filtered feed water through membranes in multiple passes.

Another form of filtration utilizes electrodialysis (ED) by applying direct electrical current to feed water within a container having a stack of ion-exchange membranes. Positive sodium ions produced by dissolved salt molecules pass through cation membranes while negative chloride ions pass through anion membranes to convert the feed water into separate streams of brine and filtered water. This process is generally limited to low concentrations of saline water and is subject to fouling of membranes. In order to alleviate fouling, the electrical current may be reversed in a process known as electrodialysis reversal (EDR).

Freezing methods have also been used for desalination. Common techniques generally involve pumping a refrigerant, such as butane or carbon dioxide, directly into feed water within a crystallization unit to produce a slurry of brine and ice crystals. The slurry is then pumped to a wash unit in order to separate ice crystals from brine by using a liquid, such as freshwater, to wash the brine from the ice crystals. To facilitate separation, another liquid such as oil may be added in the wash unit or a separation column. Ice crystals are then transferred to a melter unit where they are melted to provide product water.

In some variations, slurry may be produced by vacuum, eutectic or clathrate processes. Vacuum freezing typically involves spraying feed water into a vacuum chamber where partial vaporization occurs and ice crystals are formed when the water loses heat. The ice crystals then mix with the remaining feed water to produce a slurry. Eutectic freezing generally facilitates separation of brine from ice crystals by forming salt crystals at a temperature where both salt and ice crystals may be formed. Salt crystals are more easily washed away from ice crystals than dissolved salt, which frequently becomes trapped during ice crystal formation. Clathrate freezing may also be used to facilitate separation of brine from ice crystals by using hydrocarbons such as methane, ethane or butane to form hydrates that block salt from becoming trapped inside molecular cages of ice.

Other freezing techniques have used heat exchangers such as tubes, drums or plates for progressive growth of ice crystals along a surface on the opposite side of a wall containing a refrigerant such as ethylene glycol. As an example, feed water may be pumped into a crystallization chamber, such as a tube or drum, that is immersed in a coolant bath so that ice crystals may grow along the internal surface of the crystallization chamber. The crystallization chamber is then removed from the coolant bath so that the ice crystals may be melted to provide product water. Conversely, a refrigerant may be pumped into a tube that is immersed in a tank of feed water so that ice crystals may grow along the external surface of the tube. The tube is then removed from the tank along with the ice, and product water is produced by melting the ice.

SUMMARY OF THE INVENTION

The present invention generally relates to the field of water desalination, and more particularly, to apparatus and methods for separating salts, minerals, organic matter and other impurities from seawater, brackish water, wastewater or other water resources by freezing contained water in a downward vertical direction.

In one embodiment, feed water is pumped through a water intake pipe into a tank having an opening for a refrigerant to contact the upper surface of the feed water and form a layer of ice. During this process, salt and other impurities are rejected from the ice layer into the feed water below. By continuing this process, the feed water will freeze in a downward vertical direction as the ice layer thickens. Salt and other impurities will continue to be rejected into the feed water and may be drained from the tank through a drain pipe after a block of ice is formed. Additional feed water may then be pumped into the tank to raise the block of ice through the opening in the tank for removal by a push rod, moveable arm or other mechanical device. The block of ice may then be melted to provide product water.

In another embodiment, feed water is pumped through a water intake pipe into an enclosed tank having a refrigerant intake and exhaust pipe for supplying a refrigerant into the upper portion of the enclosed tank. The feed water is then frozen in a downward vertical direction until a block of ice is formed, and rejected salt and other impurities may be drained from the enclosed tank through a drain pipe. Additional feed water may be pumped into the enclosed tank to raise the block of ice and displace the refrigerant from the enclosed tank through the refrigerant intake and exhaust pipe. A panel of the enclosed tank is then opened to allow the block of ice to be removed from the enclosed tank and the displaced refrigerant may be used to eject the block of ice from the enclosed tank with positive pressure. The panel is then closed and additional refrigerant may be drawn into the enclosed tank with negative pressure by partially draining the additional feed water through the drain pipe.

These embodiments, as well as others, may utilize a doubled-walled tank to provide an insulation chamber between internal and external walls of the tank. An insulation fluid, such as air or oil, may be pumped into the insulation chamber to control the temperature of the internal wall of the tank and insulate the feed water from the refrigerant along the surface of the internal wall. Such insulation will facilitate freezing of the feed water in a downward vertical direction. After a block of ice is formed, the temperature of the insulation chamber may be increased to melt the surfaces of the block of ice that contact the internal wall of the tank in order to facilitate vertical movement of the block of ice. Such movement should occur when the block of ice is raised by additional feed water for removal or ejection of the block of ice from the tank.

Multiple tanks may also be utilized to increase the efficiency, scale and volume of production. They may be positioned adjacent to a conveyor platform that receives blocks of ice from the tanks and convey the blocks of ice by mechanical devices such as motorized belts or rollers, or by active flow of a liquid such as freshwater. The conveyor platform may also be inclined to use gravitational force. Further, multiple tanks may be arranged in multiple levels with multiple conveyor platforms and shared pipes.

Although several embodiments of the present invention are disclosed, it should be understood that other variations, modifications, equivalents and embodiments may be made or used by those skilled in the art without departing from the scope and spirit of the present invention.

DETAILED DESCRIPTION

Figure 1:
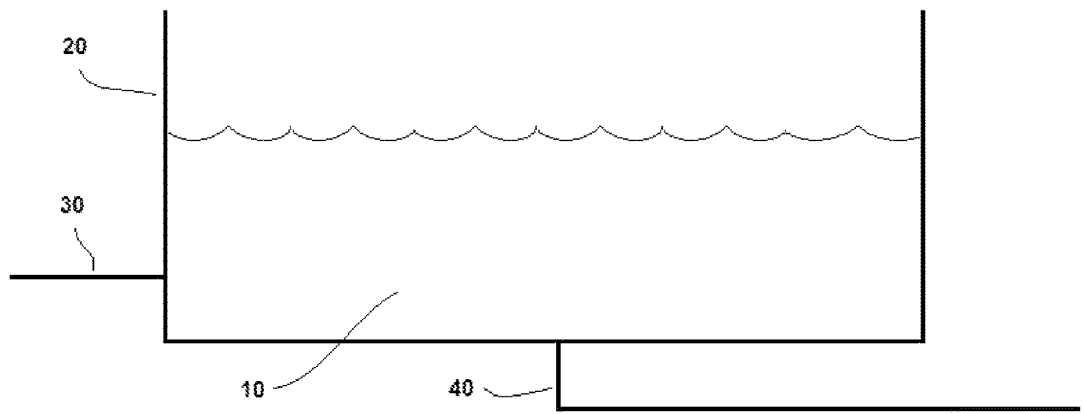
FIG. 1 is a schematic view of an apparatus for freezing water in a downward vertical direction.
Figure 2:
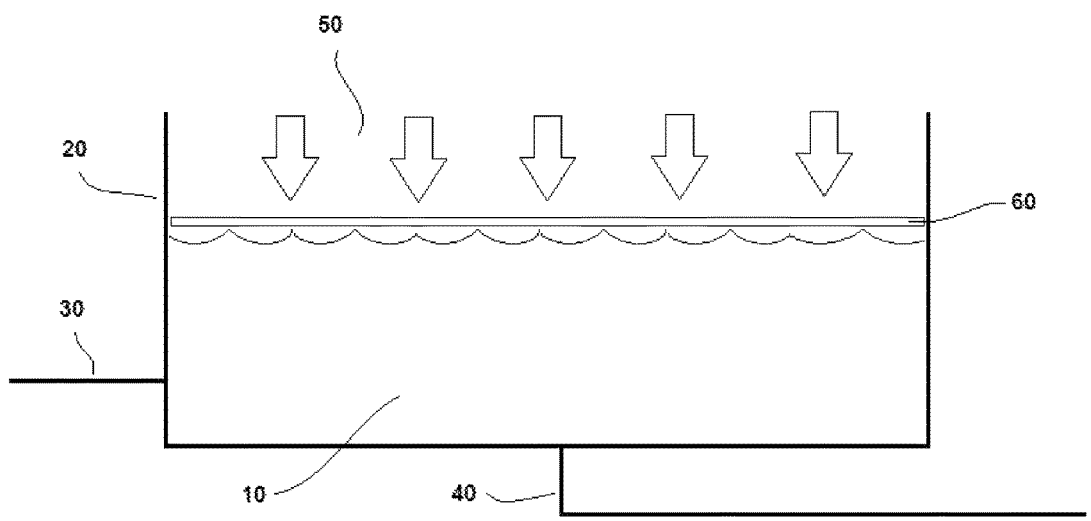
FIG. 2 is a schematic view of the apparatus shown in FIG. 1, further showing a refrigerant supplied to the upper surface of feed water contained in the apparatus.

Referring to FIG. 1, feed water 10 from a water resource such as seawater, brackish water or wastewater is pumped into a tank 20 through a water intake pipe 30 and discharged through a drain pipe 40. As shown in FIG. 2, a refrigerant 50 such as chilled air, nitrogen or oxygen is supplied to the upper surface of the water 10 contained in the tank 20 at an appropriate temperature to form a layer of ice 60. During this freezing process, water molecules crystallize to form a lattice structure which allows the ice layer 60 to float on top of the water 10 while rejecting salt, organic compounds, minerals or other impurities into the water 10 beneath the layer of ice 60.

Figure 3:
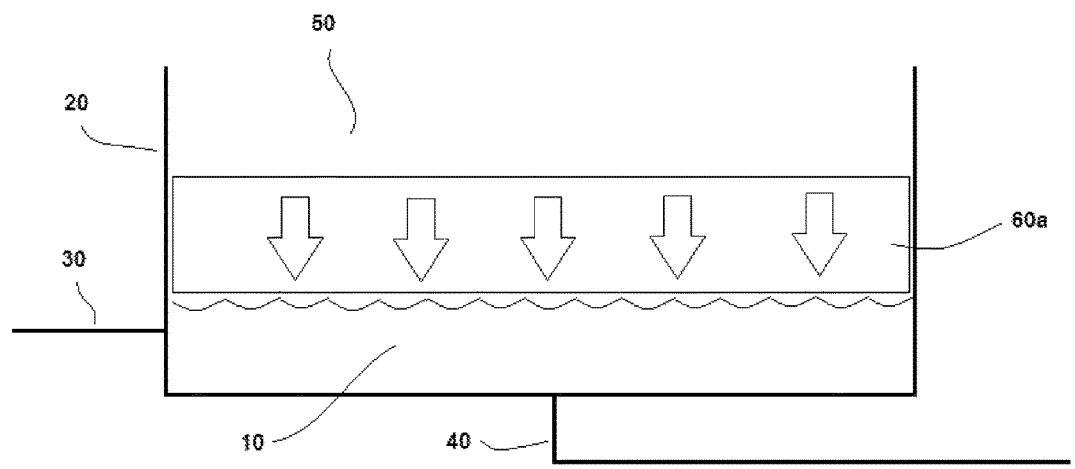
FIG. 3 is a schematic view of the apparatus shown in FIG. 1, further showing a block of ice formed by freezing water in a downward vertical direction.
Figure 4:
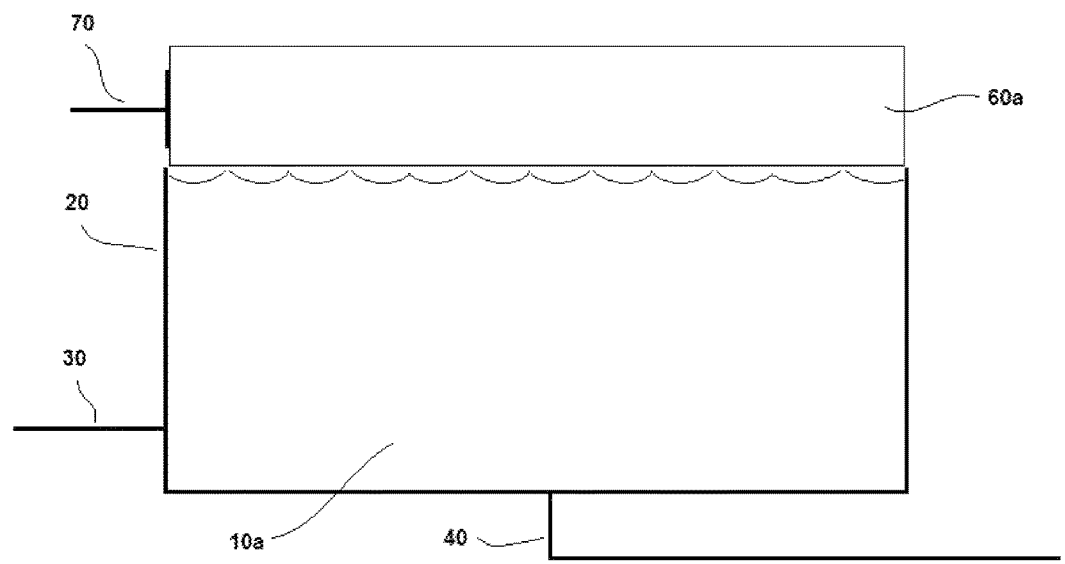
FIG. 4 is a schematic view of the apparatus shown in FIG. 1, further showing a block of ice raised by additional feed water for removal by a mechanical device.

Referring to FIG. 3, the temperature of the refrigerant 50 is indirectly transferred through the layer of ice 60 to continuously freeze the water 10 in a downward vertical direction until a block of ice 60a is formed. Impurities are then discharged with the remaining water 10 through the drain pipe 40. As shown in FIG. 4, feed water 10a is then pumped into the tank 20 to raise the block of ice 60a above at least one wall of the tank 20 and a mechanical device such as a push rod 70 or moveable arm is used to remove the block of ice 60a from the tank 20. The block of ice 60a is then melted to provide product water.

Figure 5:
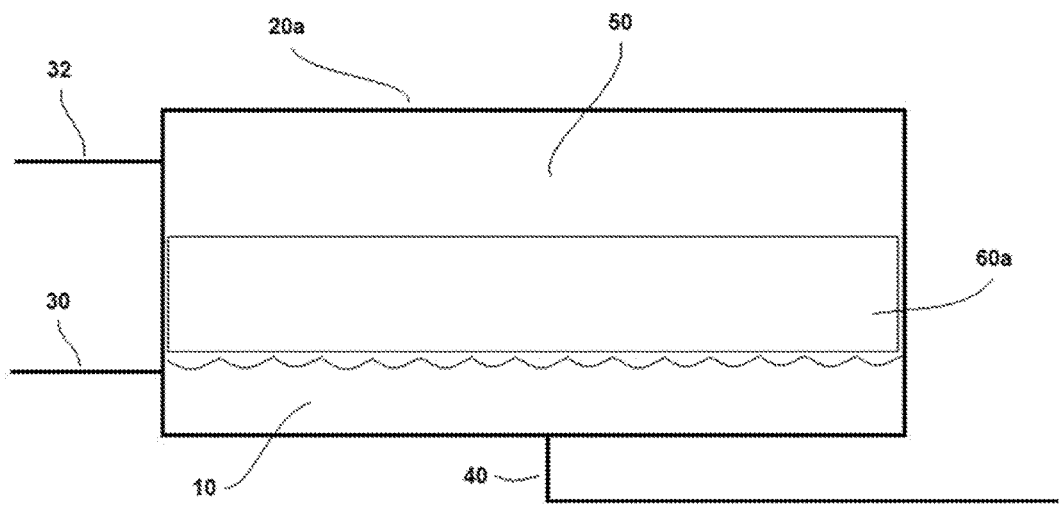
FIG. 5 is a schematic view of another embodiment of an apparatus for freezing water in a downward vertical direction.
Figure 6:
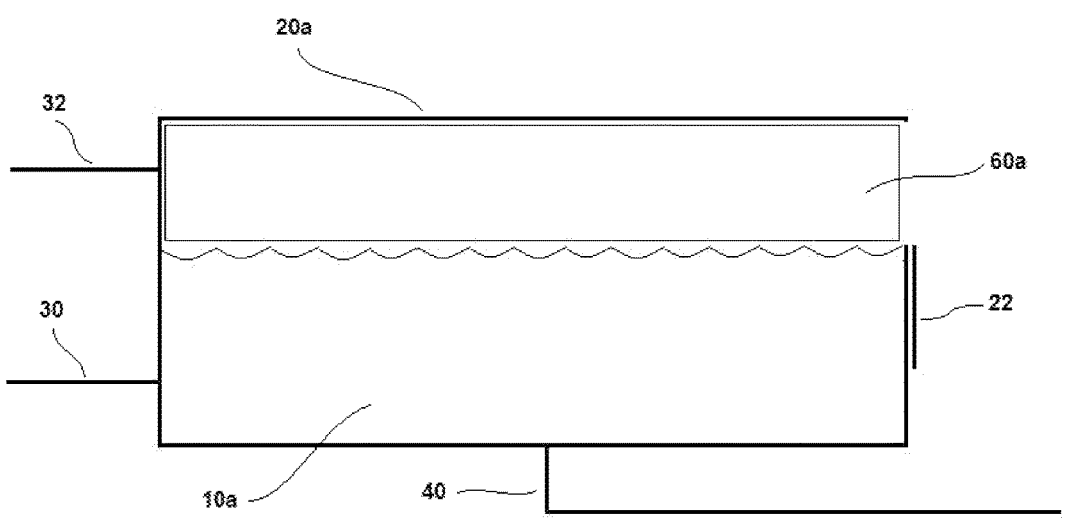
FIG. 6 is a schematic view of the apparatus shown in FIG. 5, further showing a block of ice raised by additional feed water for ejection by a refrigerant with positive pressure.

In an alternative embodiment, shown in FIG. 5, feed water 10 is pumped into an enclosed tank 20a through a water intake pipe 30 and discharged through a drain pipe 40. Refrigerant 50 is pumped into the enclosed tank 20a through a refrigerant intake and exhaust pipe 32, which may consist of separate pipes. As in the previous embodiment, the refrigerant 50 freezes the contained water 10 to form a block of ice 60a. After rejected impurities are discharged with the remaining water 10 through the drain pipe 40, additional feed water 10a is pumped into the enclosed tank 20a to raise the block of ice 60a, as shown in FIG. 6. During this process, the block of ice 60a displaces the refrigerant 50 out of the enclosed tank 20a and the refrigerant is removed through the refrigerant intake and exhaust pipe 32. A panel 22 of the enclosed tank 20a is then opened, for example by swinging or sliding the panel, to enable the block of ice 60a to be removed from the enclosed tank 20a. The displaced refrigerant 50 is then pumped or otherwise supplied back into the enclosed tank 20a through the refrigerant intake and exhaust pipe 32 to eject the block of ice 60a out the opening of panel 22 with positive pressure. After the block of ice 60a is completely outside the tank 20a, the panel 22 is closed. In this manner, the refrigerant 50 may be recycled or recirculated in order to reduce or minimize the amount of energy required to form multiple blocks of ice 60a. The feed water 10a may also be partially drained through the drain pipe 40 to draw additional refrigerant 50 into the tank 20a through the refrigerant intake and exhaust pipe 32 with negative pressure after the ice block 60a has been ejected.

Figure 7:
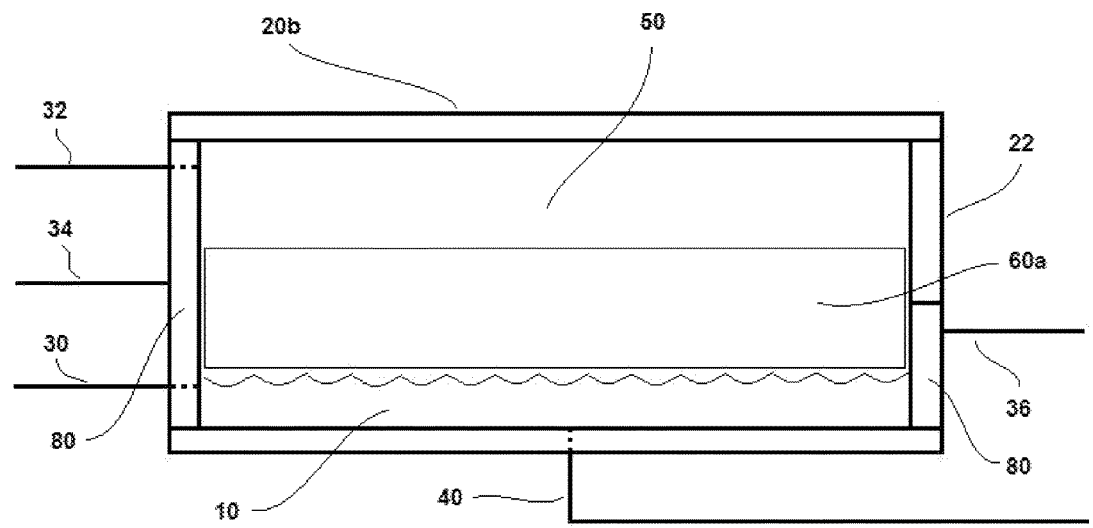
FIG. 7 is a schematic view of the apparatus shown in FIG. 5, further showing an insulation chamber for insulating the feed water from the refrigerant and melting surfaces of the block of ice to facilitate vertical movement.

FIG. 7 shows another embodiment of the present invention with a double-walled tank 20b having an insulation chamber 24 between internal 26 and external 28 walls of the tank 20b. A fluid 80, such as oil or air, is pumped into the insulation chamber 24 through an insulation intake pipe 34 in order to control or modify the temperature of the internal walls 26. When the temperature of the internal walls 26 is higher than the temperature of the water 10 contained inside the tank 20b, the water 10 will be insulated from the refrigerant 50 along the internal walls 26. This insulation will allow the refrigerant 50 to freeze the upper surface 60 of the water 10 in a downward vertical direction to form a block of ice 60a. After the block of ice 60a is formed, the temperature of the internal walls 26 may be increased to facilitate vertical movement of the block of ice 60a by pumping a higher temperature fluid 80a (not shown) through the insulation intake pipe 34 and purging or removing the lower temperature fluid 80 through an insulation exhaust pipe 36. The increased temperature of the internal walls 26 will facilitate vertical movement of the block of ice 60a by melting the surfaces of the block of ice 60a that contact the internal walls 26. As in the previously described embodiments, the block of ice 60a is raised by pumping additional feed water 10a into the tank 20b and then removed by opening the panel 22 and pumping the refrigerant 50 into the tank 20b to eject the block of ice 60a outside the tank 20b with positive pressure.

Figure 8:
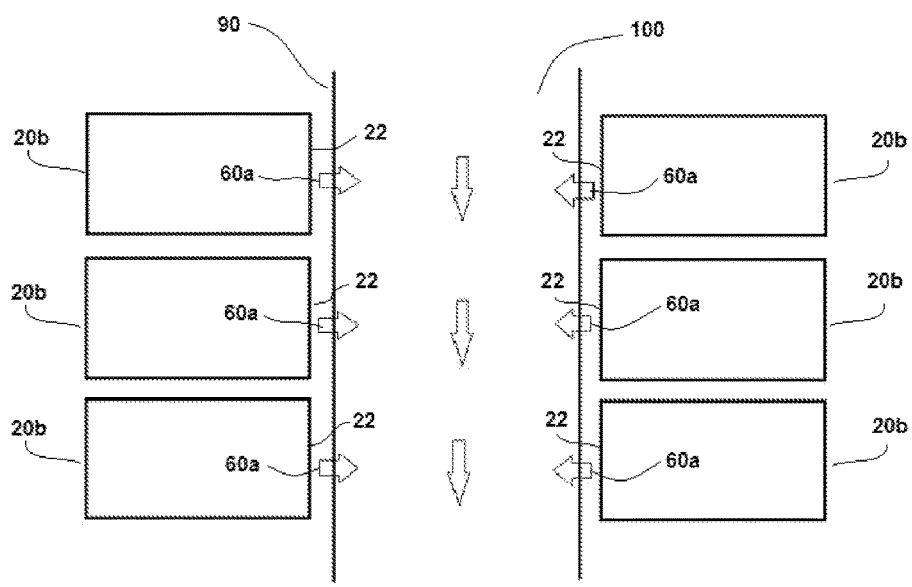
FIG. 8 is a simplified plan view of multiple tanks in accordance with the present invention that are adjacent to a conveyor platform for conveying blocks of ice.

FIG. 8 shows a simplified plan view of multiple tanks 20b adjacent to a conveyor platform 90. The tanks 20b are positioned with their panels 22 alongside the conveyor platform 90 so that blocks of ice 60a (represented by arrows) are ejected out the opened panels 22 onto the conveyor platform 90. The blocks of ice 60a are then conveyed along the conveyor platform 90 to one or more locations where they will melt into product water. To facilitate conveyance of the blocks of ice 60a, the conveyor platform 90 may contain a liquid 100 such as freshwater to allow the blocks of ice 60a to float as they are conveyed with mechanical devices such as motorized belts or rollers, or by active flow of the liquid 100. The conveyor platform 90 may also be inclined to allow the blocks of ice 60a to float or slide down the conveyor platform 90 with gravitational force.

Figure 9:
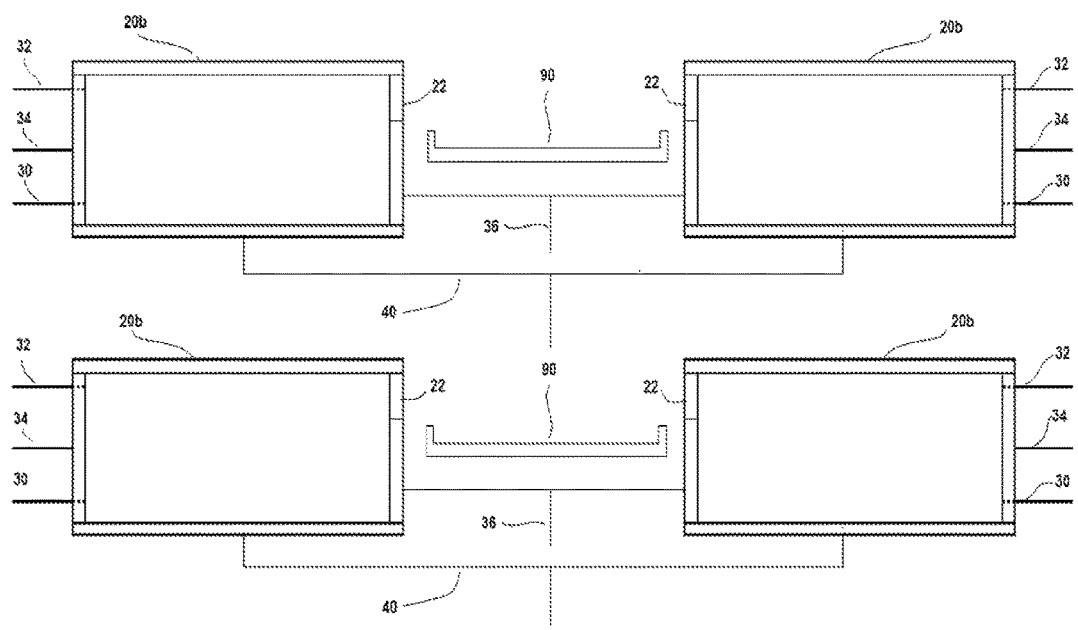
FIG. 9 is a schematic view of multiple tanks in accordance with the present invention that are arranged in multiple levels for increased efficiency, scale and production.

Multiple tanks 20b may also be arranged in multiple levels, as shown in the sectional view of FIG. 9. Conveyor platforms 90 may be provided between tanks 20b at each level and positioned beneath the panels 22 to capture the blocks of ice as they are ejected from the tanks 20b. Multiple tanks 20b may also share pipes, such as insulation exhaust pipes 36 and water drain pipes 40. Although not shown, other pipes may be shared by the tanks 20b as well.

While several embodiments of the present invention have been described above, it should be understood that other variations, modifications, equivalents and embodiments may be made or used by those skilled in the art without departing from the scope and spirit of the present invention.

I claim:

1. An apparatus for separating salt, minerals, organic matter or other impurities from seawater, brackish water, wastewater or other water resource, comprising:
   at least one tank having at least one opening for supplying a refrigerant to an upper portion of said tank, wherein at least one block of ice is formed by supplying said refrigerant to an upper portion of said tank and said block of ice is raised through said opening of said tank by supplying additional feed water into said tank;
   at least one water intake pipe connected to said tank for supplying feed water into said tank; and
   at least one drain pipe connected to said tank for draining a portion of said feed water including impurities from said tank.

2. An apparatus for separating salt, minerals, organic matter or other impurities from seawater, brackish water, wastewater or other water resource, comprising:
   at least one enclosed tank having at least one panel which opened and closed, wherein at least one block of ice formed by supplying refrigerant to feed water at an upper portion of said tank, and said block of ice may be removed from said tank through at least one opening in said tank when said panel is opened;
   at least one refrigerant intake pipe connected to said enclosed tank for supplying said refrigerant to said upper portion of said enclosed tank;
   at least one water intake pipe connected to said enclosed tank for supplying said feed water into said tank; and
   at least one drain pipe connected to said tank for draining a portion of said feed water including impurities from said enclosed tank.

3. The apparatus of claim 2, wherein said refrigerant intake pipe is used as a refrigerant exhaust pipe for removing said refrigerant from said enclosed tank.

4. The apparatus of claim 3, wherein said at least one block of ice is raised by supplying additional feed water into said enclosed tank.

5. The apparatus of claim 4, wherein said refrigerant is displaced from said enclosed tank by said raising of said block of ice with said additional feed water.

6. The apparatus of claim 5, wherein said refrigerant is used to eject said block of ice from said enclosed tank with positive pressure.

7. The apparatus of claim 2, wherein said enclosed tank has at least one insulation chamber between at least one internal wall and at least one external wall of said enclosed tank.

8. The apparatus of claim 7, further comprising an insulation intake pipe connected to said insulation chamber for supplying a fluid to control the temperature of said internal wall.

9. A method for separating salt, minerals, organic matter or other impurities from seawater, brackish water, wastewater or other water resource, comprising:
   supplying feed water into at least one tank;

freezing said feed water in a downward vertical direction by supplying a refrigerant to the upper surface of said feed water; and draining brine from said tank after at least one block of ice is formed by said freezing of said feed water.

10. A method according to claim 9, further comprising raising said block of ice by supplying additional feed water into said tank.

11. A method according to claim 9, further comprising enclosing said tank.

12. A method according to claim 10, wherein said raising of said block of ice displaces said refrigerant from said enclosed tank.

13. A method according to claim 12, further comprising using positive pressure to eject said block of ice from said enclosed tank.

14. A method according to claim 13, wherein said positive pressure is produced by supplying said displaced refrigerant into said enclosed tank.

15. A method according to claim 11, wherein said enclosed tank further comprises at least one insulation chamber between at least one internal wall and at least one external wall of said enclosed tank and a fluid is supplied into said insulation chamber to control the temperature of said internal wall.

16. A method according to claim 15, wherein said feed water is insulated from said refrigerant along said internal wall to facilitate freezing of said feed water in a downward vertical direction.

17. A method according to claim 16, wherein said internal wall is heated by a fluid in said insulation chamber to melt at least one surface of said block of ice along said internal wall.

* * * * *